US008606975B2

(12) United States Patent
Srinivasan et al.

(10) Patent No.: US 8,606,975 B2
(45) Date of Patent: Dec. 10, 2013

(54) MANAGING INTERRUPTS IN A VIRTUALIZED INPUT/OUTPUT DEVICE SUPPORTING MULTIPLE HOSTS AND FUNCTIONS

(75) Inventors: Arvind Srinivasan, San Jose, CA (US); Marcelino M. Dignum, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 230 days.

(21) Appl. No.: 12/784,631

(22) Filed: May 21, 2010

(65) Prior Publication Data

US 2011/0289242 A1 Nov. 24, 2011

(51) Int. Cl.
G06F 13/28 (2006.01)
G06F 13/24 (2006.01)
G06F 15/167 (2006.01)

(52) U.S. Cl.
USPC .................. 710/22; 710/23; 710/24; 710/25; 710/26; 710/27; 710/28; 710/260; 709/212

(58) Field of Classification Search
None
See application file for complete search history.

(56) References Cited

U.S. PATENT DOCUMENTS

| | | | | |
|---|---|---|---|---|
| 5,727,227 | A * | 3/1998 | Schmidt et al. | 712/36 |
| 6,098,144 | A * | 8/2000 | De Oliveira et al. | 710/269 |
| 6,425,038 | B1 * | 7/2002 | Sprecher | 710/269 |
| 6,456,628 | B1 * | 9/2002 | Greim et al. | 370/466 |
| 6,678,801 | B1 * | 1/2004 | Greim et al. | 711/148 |
| 6,738,847 | B1 * | 5/2004 | Beale et al. | 710/260 |
| 6,952,749 | B2 * | 10/2005 | Kim | 710/260 |
| 7,139,857 | B2 * | 11/2006 | Wahler | 710/269 |
| 7,584,316 | B2 * | 9/2009 | Oner | 710/263 |
| 7,730,248 | B2 * | 6/2010 | Goss et al. | 710/261 |
| 7,813,366 | B2 * | 10/2010 | Freimuth et al. | 370/419 |
| 2006/0218328 | A1 * | 9/2006 | Vega et al. | 710/260 |
| 2006/0294277 | A1 | 12/2006 | Tetrick | |
| 2008/0148295 | A1 | 6/2008 | Freimuth | |

(Continued)

FOREIGN PATENT DOCUMENTS

EP 2241978 A1 10/2010
WO 2007123541 A1 11/2007

OTHER PUBLICATIONS

Carter, Scott "Interrupt Resource Management Feature in the OpenSolaris OS", Aug. 2009, pp. 1-4.

(Continued)

*Primary Examiner* — Henry Tsai
*Assistant Examiner* — Jing-Yih Shyu
(74) *Attorney, Agent, or Firm* — Park, Vaughan, Fleming & Dowler LLP; Daniel E. Vaughan

(57) ABSTRACT

Methods and apparatus are provided for managing interrupts within a virtualizable communication device. Through virtualization, one port of the device may be able to support multiple hosts (e.g., computers) and multiple functions operating on each host. Any number of interrupt resources may be allocated to the supported functions, and may include receive/transmit DMAs, receive/transmit mailboxes, errors, and so on. Resources may migrate from one function to another, such as when a function requests additional resources. Each function's set of allocated resources is isolated from other functions' resources so that their interrupts may be managed and reported in a non-blocking manner. If an interrupt cannot be immediately reported to a destination host/function, the interrupt may be delayed, retried, cancelled or otherwise handled in a way that avoids blocking interrupts to other hosts and functions.

19 Claims, 10 Drawing Sheets

(56) References Cited

U.S. PATENT DOCUMENTS

| | | |
|---|---|---|
| 2009/0304022 A1 | 12/2009 | Yang |
| 2010/0005201 A1* | 1/2010 | Otsuka et al. .................. 710/48 |
| 2010/0115174 A1 | 5/2010 | Akyol |
| 2010/0122006 A1 | 5/2010 | Kanaya |
| 2011/0153893 A1* | 6/2011 | Foong et al. .................. 710/268 |

OTHER PUBLICATIONS

Krause, Michael et al., "I/O Virtualization and Sharing", 2006, pp. 1-34.

* cited by examiner

MANAGING INTERRUPTS IN A VIRTUALIZED INPUT/OUTPUT DEVICE SUPPORTING MULTIPLE HOSTS AND FUNCTIONS

RELATED APPLICATIONS

The subject matter of the present application is related to U.S. patent application Ser. Nos. 12/697,940 and 12/697,953, entitled "Virtualization of an Input/Output Device for Supporting Multiple Hosts and Functions," which were filed Feb. 1, 2010.

BACKGROUND

This invention relates to the field of computers. More particularly, apparatus and methods are provided for managing interrupts within a virtualized input/output device that allows multiple hosts and functions to share a single port of the device.

Virtualized I/O devices provide considerable value because they allow a high-performance peripheral component to be shared among multiple applications, making it seem as if each application is receiving a separate, dedicated I/O device. From an application's perspective, each virtual device is completely isolated, and the device driver associated with each virtual device is unaware of the existence of any other. By isolating each virtual device's data from all other virtual devices, data privacy and integrity can be assured.

Peripheral Component Interconnect Express (PCIe) is a very widely used, standardized, computer system I/O technology. PCIe includes a virtualization model in which a Function operating on a host provides hardware traffic isolation and protection, as well as a standardized interface. Via this standard interface, system software can configure and manage anything from a monolithic input/output device supporting a single Function to a high-throughput input/output device supporting hundreds of virtual Functions.

Sharing of one physical input/output port among multiple Functions through virtualization, especially among multiple Functions hosted by different hosts, has not been successfully implemented previously because it presents several challenges. Among those challenges are isolating the hosts and Functions (even in the presence of errors), handling packets destined for multiple Functions (e.g., broadcast packets), supporting different data throughput rates for different hosts, and so on. Of considerable importance is the need to prevent support to multiple Functions and hosts to be blocked because of an issue or problem with one Function.

One particular difficulty lies in managing interrupts for the various Functions and hosts, while providing a fair allocation of resources and without blocking Traditional methods of parceling interrupt resources among multiple consumers usually involve static allocation, and require the device to be re-initialized in order to change the allocation. This can be very inefficient, especially if resources must be re-allocated on more than an occasional basis. To efficiently and effectively support multiple hosts and Functions, interrupt resources should be dynamically allocable and re-allocable.

SUMMARY

In some embodiments of the invention, apparatus and methods are provided for managing interrupts within a virtualized input/output device, wherein multiple hosts, and multiple functions residing on those hosts, share one physical port of the input/output device.

In these embodiments, two levels of virtualization are implemented. On one level, the input/output port (e.g., one port of a network interface circuit) simultaneously supports multiple host entities (e.g., PCIe root complexes), allowing each host to act as if it has use of a dedicated device. On a second level, the port simultaneously serves multiple Functions on one or more of the host entities.

The input/output device comprises multiple buffers; each buffer stores packets for any number of functions operating on one host, and can be dynamically reallocated from one host to another. Multiple buffers may simultaneously support the same host and its functions. The device also comprises ingress managers for managing storage of packets within buffers, egress managers for initiating transfer of packets from a buffer to its destination host/functions, and logical bus interfaces for forwarding the packets to their destinations. Each cooperative combination of one buffer, supporting ingress managers, an egress manager and a bus interface may herein be collectively termed a "host assembly," and the input/output device may comprise any number of such host assemblies.

After a packet is received and classified, it is distributed to each buffer's ingress managers. Within a set of ingress managers serving one buffer, each manager corresponds to one function of the buffer's corresponding host, and is programmed with criteria for identifying packets accepted or desired by that function. A copy of the packet is stored in a buffer if at least one of the buffer's ingress managers accepts it. Control information for processing the packet upon egress from the buffer is also stored in the buffer for each packet.

Egress managers for each buffer extract packets and speculatively move them via a pipeline to logical bus interfaces for transfer to destination functions. Associated DMA (Direct Memory Access) engines determine whether or not to proceed with each packet and, if so, identify destination host memory addresses. The pipeline comprises separate structures for storing packets and for storing control information for facilitating transfer of the packets to their destinations. The egress manager is also responsible for replicating a packet destined for multiple functions on one host (e.g., a multicast or broadcast packet).

Transfer of a packet may be aborted by the device (e.g., if a memory error is detected) or by the receiving host (e.g., if a destination function is reset or otherwise unavailable). Errors or delays in transferring a packet to a host/function will not block other hosts and functions from receiving the same packet and/or other packets.

Resources for generating interrupts are allocated among supported functions and can be dynamically reallocated as necessary and are operated in a non-blocking manner. An interrupt event reported by a resource associated with a function is mapped to one of the function's interrupt vectors at a resource bind array located in an interrupt block of a host assembly supporting that function.

From the interrupt block, an interrupt message is asserted to a device interrupt controller, which consults a mapping table for the affected function to determine whether an interrupt can be reported to the function's host. If the interrupt can be reported, it is signaled to a host interrupt controller that is configured to compose an appropriate interrupt (e.g., based on the type of interrupt employed by the function) and dispatch it across the host bus.

In case an interrupt cannot be reported (e.g., because of a lack of transmission credits, because a host/function is currently unavailable), the interrupt may be retried, delayed or cancelled. By logically isolating each function's interrupts, they can be managed in a non-blocking manner.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Virtualization of a Communication Device

In some embodiments of the invention, apparatus and methods are provided for virtualizing one or more physical ports of an input/output device to support multiple hosts and one or more functions on each host.

In some specific implementations, the input/output device is a network interface circuit (NIC), each host comprises a PCIe (Peripheral Component Interconnect Express) root complex and the functions are PCIe functions. Other implementations and embodiments may be readily derived from the following description for environments comprising other types of devices, hosts and communication protocols/architectures.

Figure 1:
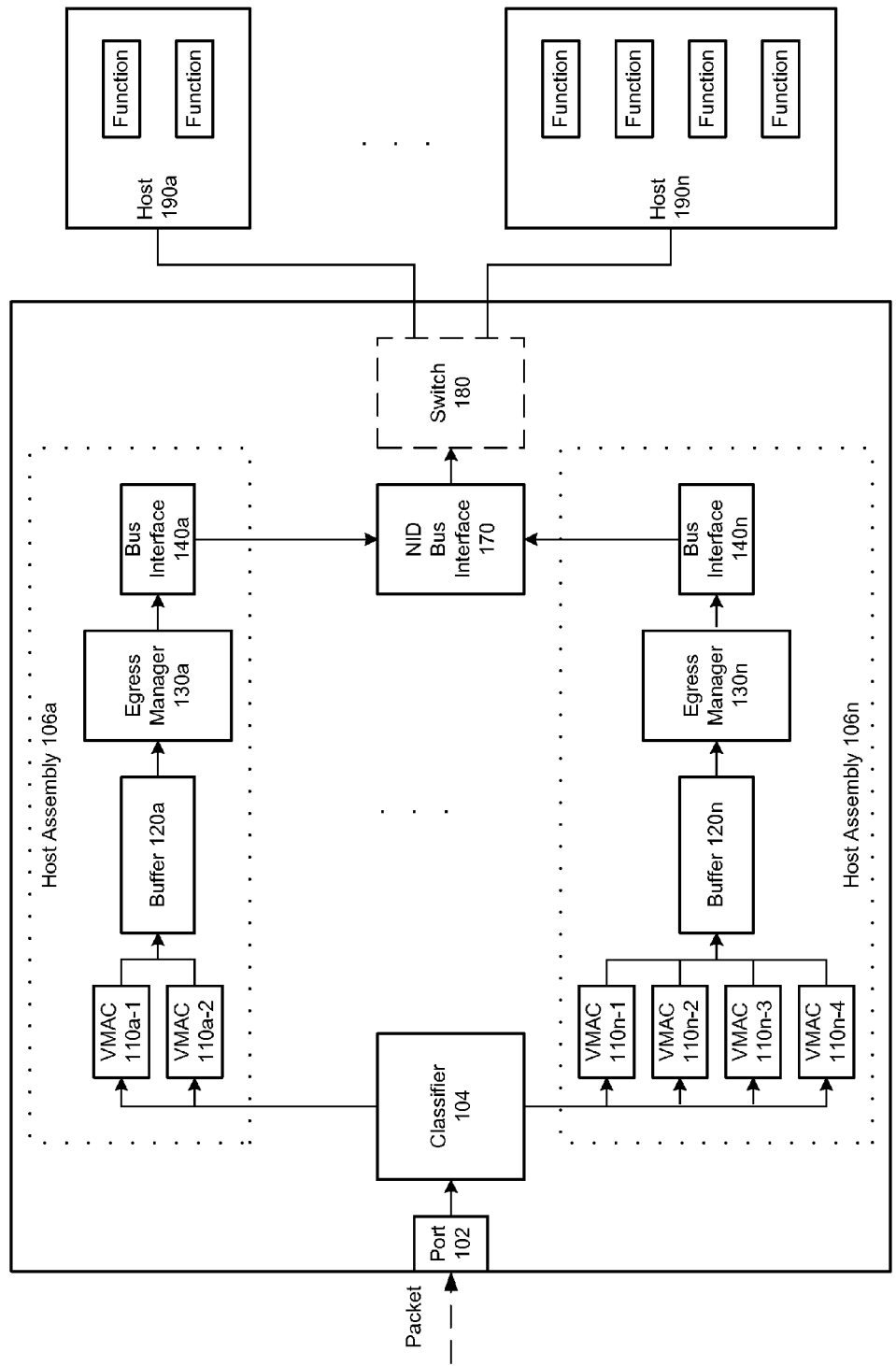
FIG. 1 is a block diagram of a network interface device with which some embodiments of the present invention may be implemented.

FIG. 1 is a block diagram of a network interface device with which some embodiments of the present invention may be implemented. Although FIG. 1 depicts only a single port of the device being virtualized to support multiple hosts and functions, multiple ports of the same device may be simultaneously virtualized in the same manner.

Network interface device 100 of FIG. 1 comprises port 102, classifier 104, one or more host assemblies 106 and optional switch 180. Each host assembly comprises at least one virtual MAC (Medium Access Control modules) 110, packet buffer 120, egress manager 130 and host assembly bus interface 140.

The device may be coupled to any number of hosts 190, each of which may host any number of functions. Other components of the network interface device are omitted in the interest of clarity. The network interface device may be implemented as part of a single semiconductor chip.

Port 102 is coupled to a data link and receives (and transmits) communications (e.g., packets, datagrams, cells) on behalf of the hosts and functions it supports. Classifier 104 is configured to classify incoming communications, and may operate to identify one or more destinations (e.g., hosts, functions) for each communication, and/or one or more DMA (Direct Memory Access) engines or other components for transferring the communication to its destination(s).

For example, the classifier may comprise multiple classification tables configured to select a packet's destination function(s) based on its destination address and/or other information gleaned from the packet, and/or select one or more DMA engines for transferring the packet to those functions.

Illustrative methods of managing a classification apparatus to support multiple host functions are described in U.S. patent application Ser. No. 12/633,926, entitled Apparatus and Method for Managing Packet Classification Tables, which was filed Dec. 9, 2009 and is incorporated herein by reference.

Virtual MACs (VMACs) 110 are configured to filter communications, for storage in buffers 120, based on how they have been classified and/or inherent characteristics or attributes of the communications. Buffers 120, which may be implemented as FIFO (First-In, First-Out) queues, are configured to store communications for transfer to their destination hosts and functions, and may be of any suitable size (e.g., 16K, 32K, 64K).

An egress manager 130, which comprises DMA engines and other components, is configured to transfer packet data from a packet buffer to a host 190 via a corresponding logical bus interface 140, NID bus interface 170 and switch (or other comparable communication component) 180. An illustrative egress manager is described in more detail below, with reference to FIG. 2.

Logical host assembly bus interfaces 140 comprise physical hardware modules that can be dynamically allocated to different hosts (i.e., whichever host the corresponding buffer 120 is allocated to). NID bus interface logic 170 places outgoing communications in the correct format for transmission to a host, manages PCIe credits and performs other necessary tasks to manage communications across the PCIe bus. Switch 180 may be a multi-root aware switch in the illustrated embodiment of the invention, but in other embodiments may be replaced by other elements capable of forwarding a packet or other communication for delivery to a host.

Each host comprises an independent PCIe root complex and an associated I/O memory subsystem, and may host any number of physical and/or virtual functions. Thus, in the illustrative environment of FIG. 1, host 190a hosts two functions, while host 190n hosts four. In this environment, hosts may be implemented as separate blades (or other types of computer processor components) installable in one server or enclosure.

Different hosts may be coupled to device 100 via links of different capacities or speeds (e.g., ×1, ×8), and therefore may exhibit different memory latency patterns. Different hosts may also process incoming packets at different rates, based on their processor configurations, application loads and/or other factors.

In the embodiments of the invention depicted in FIG. 1, each host assembly 106 serves a different host 190, and is supported by one VMAC 110 for each function operating on that host. Thus, in FIG. 1, buffer 120a of host assembly 106a is served by VMACs 110a-1 and 110a-2. Buffer 120n of host assembly 106n is served by VMACs 110n-1, 110n-2, 110n-3 and 110n-4. Each VMAC is dynamically programmable to accept or reject packets meeting specified filtering criteria.

The VMACs may be programmed by their corresponding functions and/or other supervisor entity (e.g., a service processor). The supervisor may also be responsible for instantiating, enabling, disabling, reassigning, terminating or otherwise manipulating VMACs (e.g., when a function is reset, when a new function is initialized, when a new host is coupled to the network interface device, when a host is detached).

After a packet is classified by classifier 104, and if it is not to be dropped, it may be distributed to every VMAC 110 or to some subset of all VMACs. Each VMAC that receives the packet applies its filtering criteria to decide whether to accept the packet into the associated buffer 120 on behalf of its corresponding function.

If at least one VMAC coupled to a given buffer accepts it, the packet is stored in the buffer. Because the packet may be destined for multiple different hosts (e.g., multiple functions operating on different hosts), it may be accepted by VMACs serving different buffers, and may therefore be stored in more than one buffer 120.

Specifically, for host assembly 106a, a packet that is received from classifier 104 and that matches the programmed criteria of either or both VMAC 110a-1 and VMAC 110a-2, is stored in buffer 120a. Similarly, if the packet survives the filtering rules of any of VMACs 110n-1, 110n-2, 110n-3 or 110n-4, it will be stored in buffer 120n of host assembly 106n.

In some implementations, a given VMAC outputs a signal indicating whether to accept a packet based on its programmed filtering criteria. That signal may be OR'd or otherwise combined with signals from its sibling VMACs (i.e., other VMACs feeding the same buffer) to yield a final accept/reject signal for the packet for the supported buffer.

Even if a packet is destined for multiple functions operating on one host, the buffer serving that host may store only a single copy of the packet, along with information identifying its destinations. Upon egress from the buffer, however, multiple copies of the packet may be issued—one for each function. Alternatively, multiple copies of the packet may be stored in the buffer, and coded for different destinations.

In some embodiments of the invention, a VMAC 110 filters packet data based on the DMA engine(s) for which the packets were classified (e.g., by classifier 104). Specifically, one or more DMA engines within network interface device 100 are bound to each function supported by the device, and each buffer 120 is supported by a different set of DMA engines (e.g., as part of egress manager 130). Each VMAC is also associated with a single function, and therefore can be programmed to accept packets classified for the DMA engine(s) bound to its function. A VMAC may reject packets not classified for the DMA engine(s) bound to its function.

In some embodiments, a VMAC may also (or instead) be programmed to accept or reject a packet based on one or more characteristics other than its classification, such as the presence or absence of errors (e.g., checksum, CRC), its size (e.g., jumbo or non-jumbo), any protocol options, etc.

For example, when a function enters promiscuous mode, a corresponding VMAC may be programmed to accept all packets, regardless of classification and characteristics. Yet another function may enter promiscuous mode, but not want to see packets that have errors; a corresponding VMAC will therefore be programmed to accept all packets except those with errors.

Yet another VMAC may be programmed to reject all packets with checksum errors (e.g., even if they are classified for the function). Another VMAC may be programmed to accept all packets having CRC errors, regardless of classification, and so on.

Thus, VMACs may filter packets based on their classification (e.g., DMA engine(s)) and/or inherent characteristics of the packets. Because each supported function is served by its own set of VMACs, which can be programmed with any desired permutation of packet characteristics, the function has very fine-grained control over the packets it will receive. In addition, because each function's filtering criteria is applied independently, one VMAC's rejection of a packet based on its function's criteria will not block any other function from receiving the packet.

Virtual MACs 110 can be dynamically instantiated, destroyed, programmed and reprogrammed by a supervisor entity (e.g., a service processor) that also allocates or binds them to specific physical and/or virtual functions, such as when a host assembly is reassigned to support a different host, or when there is a change in the configuration of the functions operating on one host. A VMAC's bind data identifies the DMA engine(s) bound to its corresponding function, and identifies the criteria to be used to filter packets for the function.

In an illustrative embodiment of the invention, the chip or other circuitry comprising network interface device 100 comprises twelve buffers 120 and associated components (i.e., egress manager 130 and logical bus interface 140). The term "host assembly" may be used to encompass each group of these components, along with the VMACs that filter packets for storage in the buffer.

The device may therefore be simultaneously coupled to any number of hosts from one to twelve, inclusive. Also in this embodiment, each host assembly comprises or is allocated up to four DMA engines (e.g., as part of its egress manager 130) for transferring packets to the connected host.

Because any host assembly may be used to support any of multiple different hosts, each assembly's bus interface 140 is configurable to support any host to which device 100 may be coupled.

In implementations of this embodiment in which each host assembly is coupled to and supports a separate host, as in FIG. 1, a host may sustain up to four functions. For example, each function within host 190n would be allocated one DMA engine, while DMA engines supporting host 190a may be divided two and two or three and one between the two functions.

In other embodiments of the invention, however, a consolidated mode of operation may be employed, in which multiple host assemblies are coupled to the same host, thereby allowing that host to use more than four DMA engines and support more than four functions. For example, if host 190a were to shut down, then host assembly 106a could be reassigned to support host 190n. In some circumstances (e.g., with a slow host), multiple host assemblies may be allocated to a single host in order to avoid undesired dropping of packets.

Just as VMACs 110 have bind data that identifies the DMA engine(s) bound to the VMACs' corresponding packet buffer, and that is used to identify packets to accept for those functions, egress managers 130 have associated bind data to identify and locate the hosts they support. Illustratively, each egress manager comprises one or more DMA engines, and each DMA engine is bound to a single function on the supported host.

In embodiments of the invention depicted in FIG. 1, when a packet is stored in a buffer 120, a control header is stored in the same buffer in conjunction with the packet. The control header is formed by the VMAC or VMACs that voted to accept the packet, and is configured to identify the packet's destination(s) (e.g., host/function), why it is being transferred to a host/function, how to transfer the packet from the network interface device (e.g., which DMA engine or engines to use) and/or other information regarding how to process the packet when it is removed from the buffer.

For example, the control header may store attributes of the packet as well as classification attributes produced by a classifier, and may therefore include information such as packet size, presence of errors, which DMA engine(s) the packet was classified for, destination address, a hash computed by hardware (e.g., so that software can use the same hash instead of re-computing it), an indication that promiscuous mode was active, etc. This information may be passed to a destination function so that it can determine why it received the packet (e.g., based on classification, based on packet characteristic, because the function was in promiscuous mode).

In some embodiments of the invention, control headers (or data for generating control headers) may be pre-configured (e.g., by functions) and stored with the VMACs. As the VMACs accept packets, they output the pre-configured data to produce corresponding control headers for insertion in the packet buffer (e.g., ahead of the packet).

In a scenario in which multiple VMACs serving one buffer accept a packet on behalf of different functions, one collective control header may be produced and stored in the buffer with one copy of the packet. The control header will include all information necessary to replicate the packet data (e.g., once for each destination function) upon egress from the buffer.

One of ordinary skill in the art will appreciate that in a traditional network interface device, separate buffers would likely be implemented for packet data and for control information. In embodiments of the present invention such as those illustrated in FIG. 1, a single host assembly and its constituent buffer can support multiple functions and store both data and control information. By accompanying each packet with a specific control header, associations between packets and control headers are more easily managed upon egress from the buffer.

When a function is reset (e.g., through a function level reset) or otherwise becomes unresponsive, VMACs associated with that function may be disabled to prevent the queuing of packets for the function. Detection of function errors that require this action, as well as the subsequent disabling of one or more VMACs may be performed by a service processor or other supervisory entity.

FIG. 1 thus illustrates embodiments of the invention in which multiple hosts and multiple functions on those hosts share a single physical network port. A network interface device such as device 100 comprises multiple host assemblies, each of which may be dynamically allocated to different hosts at different times. Although each host assembly may support only one host at a given time, multiple host assemblies may serve the same host simultaneously.

In the illustrated embodiments, the output of a packet classifier is delivered to each host assembly's ingress management entities. The ingress manager or managers serving one buffer include at least one virtual MAC for each function in the host supported by that buffer, and operate to control the flow of packet data into the buffer based on programmed filter criteria.

Each buffer is also served by one or more egress management entities for transferring packets to destination hosts and functions. The egress managers consume control information associated with each packet to determine where to send the packet data, and deliver packets to host assembly logical bus interfaces that forward the packets to their destinations.

Each host assembly bus interface is configured to support whichever host its host assembly is currently serving. Bus interfaces 140, 170 may be reconfigured or reprogrammed to support different physical media and protocols as a host assembly is reallocated to different host entities.

U.S. Pat. No. 7,500,046, which issued Mar. 3, 2009 and is entitled "Abstracted Host Bus Interface for Complex High Performance ASICs", describes an interface for coupling a device such as network interface device 100 to different types of host buses.

Figure 2:
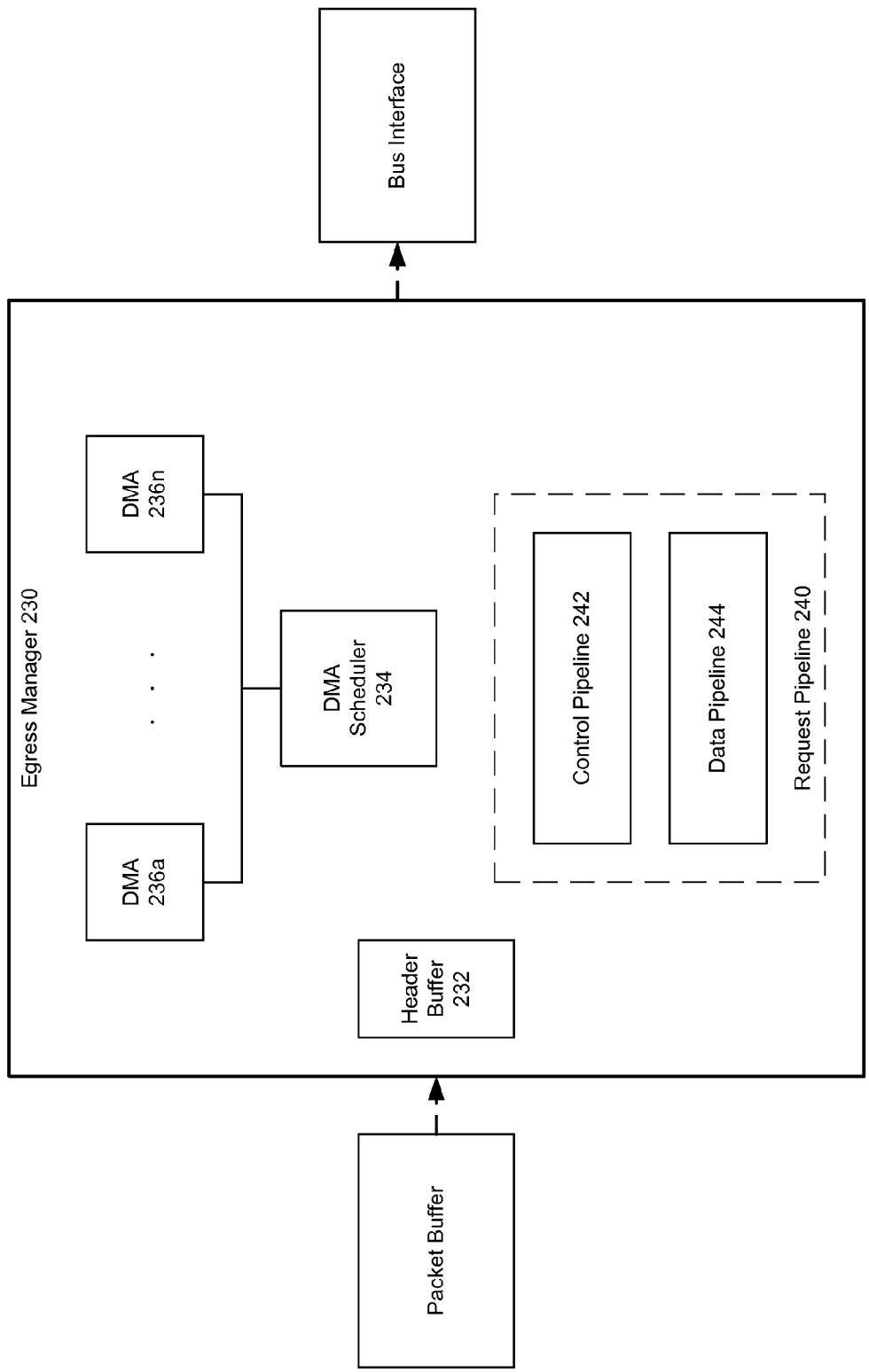
FIG. 2 is a block diagram of an egress manager for facilitating virtualization of a port of a network interface device, in accordance with some embodiments of the invention.

FIG. 2 is a block diagram of an egress manager of a communication device having one or more virtualized communication ports, according to some embodiments of the invention. As described above, egress manager 230 receives packets from a packet buffer and facilitates their transfer to hosts via corresponding logical bus interfaces.

In the embodiments of the invention represented in FIG. 2, egress manager 230 comprises header buffer 232, DMA scheduler 234, DMA engines 236 and request pipeline 240. Request pipeline 240 includes two components—control pipeline 242 and data pipeline 244. In other embodiments, an egress manager may comprise additional components.

Header buffer 232 is configured to temporarily store a control header received from the packet buffer. As described previously, a control header accompanies each packet placed into the buffer, and contains information the egress manager can use to help move the packet. A packet's control header may be copied to header buffer 232 for examination before or while the packet is extracted from the packet buffer.

DMA scheduler 234 distributes a control header (from header buffer 232) to all DMAs 236, to allow them to begin their work to identify a host buffer for storing the packet, to identify a destination address, calculate how many buffers are needed, fetch a descriptor, determine packet attributes, etc. The control header may be configured to identify the DMAs that must act on the packet (i.e., those DMAs bound to functions for which the packet is destined).

Each DMA may use the control header to make an initial decision as to whether or not to drop the corresponding packet. For example, if no host buffers are available for a given DMA, it may quickly signal that it cannot handle the packet.

While a control header is being processed by one or more DMAs, the corresponding packet is copied to data pipeline 244. As the DMAs complete their work, they populate control pipeline 242 with control information to assist the packet's transfer to a host via host interface logic (e.g., the bus interface).

Thus, even before it is certain that a packet within the packet buffer will be transferred to a host, or before details of the transfer can be calculated, the packet may be speculatively moved into the data pipeline. The size of the pipelines may be determined by some measure of the latency (e.g., maximum, average) of the DMA engines.

The latency experienced by the DMA engines is compensated for by the speculative movement forward of the data packets. By preemptively placing the packets into position for transfer to the host, they are available for processing as soon as the DMA engines provide the necessary control information. Depending on the width of pipeline 240, multiple packets may be able to be presented to the host interface logic simultaneously.

Pipeline 240 is able to operate at, or close to, the native speed of the communication bus. For example, a port operating at 40 Gb/sec could receive Ethernet packets of minimum size every 16 nanoseconds. The speculative manner in which data packets are moved through egress manager 230 allows packets to be transferred to a host with that same periodicity, even if the DMA engines require more than 16 nanoseconds to process a given packet.

One aspect of some embodiments of the invention that supports processing packets at high speed involves merging requests with the data represented by the requests. For example, when egress manager 230 issues a request to a bus interface to accept a data transfer, it forwards the data with the request. This eliminates the need to idle the egress manager while it awaits an acknowledgement of the request from the interface.

Control headers may be passed to the header buffer in the same manner. That is, the buffer may transmit the control header along with a request to the egress manager (e.g., the DMA scheduler) to accept the header.

The pipeline is able to run at a reduced clock frequency and still support full utilization of the communication link. In addition, the pipeline can easily scale or be upgraded to support devices having throughputs higher than 40 Gb/sec.

The split nature of pipeline 240 also provides separation between the data path and the DMAs. Thus, the DMA engines could be located external to a chip comprising the host assembly that includes egress manager 230.

Figure 3:
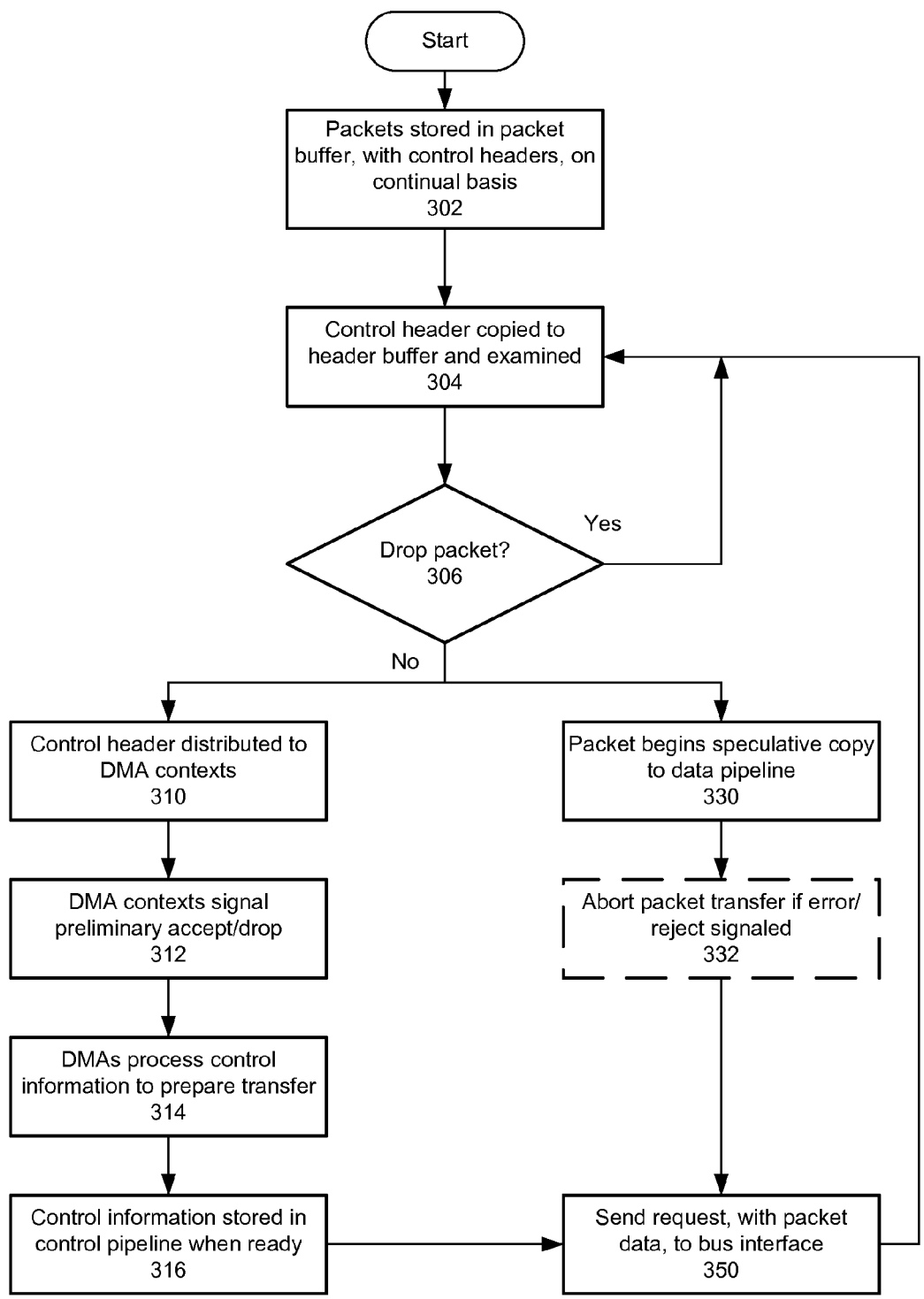
FIG. 3 is a flow chart demonstrating transfer of a packet from a packet buffer to a bus interface for delivery to one or more functions operating on a host, according to some embodiments of the invention.

FIG. 3 is a flow chart demonstrating transfer of a packet from a packet buffer to a bus interface for delivery to one or more functions operating on a host, according to some embodiments of the invention.

In operation 302, a packet is stored in the packet buffer. Methods of processing packets for storage in packet buffers, and for storing corresponding control headers, are described above.

In operation 304, the control header for a packet at the head of the buffer is moved to a header buffer (e.g., header buffer 232 of FIG. 2), and is examined (e.g., by a DMA scheduler). The control header may contain information such as the length of the packet, classification, attributes and so on, and may be used to make a preliminary determination whether to drop the packet.

For example, the packet may have been stored in the buffer even if contained an error. The control header will indicate the error, and a decision may be made (e.g., by the DMA scheduler) to drop the packet. The control header may also be examined to determine whether it contains any errors.

In operation 306, if the packet is to be dropped, it is dropped from the buffer (e.g., by moving a read pointer past it) and the method returns to operation 304 to read the next control header. If copying of the packet into the data pipeline already began before a decision is made to drop it, the pipeline may be cleaned up by moving a write pointer.

If the packet is not to be dropped, the method advances to operations 310 and 330, which represent the parallel manner in which a packet is speculatively moved forward within a data pipeline while responsible DMAs perform their processing and populate a control pipeline.

In some embodiments of the invention, after one control header is read and processed, the next one may be copied into the header buffer for processing even if its corresponding data packet is not yet at the head of the buffer.

In operation 310, the control header (or data extracted from the control header) is passed to all DMA contexts, or at least those DMAs identified in the control header.

In operation 312, for every destination function of the packet, a corresponding DMA context signals the DMA scheduler with a preliminary determination as to whether or not it can accept the packet. The DMAs may make this decision based on their current states and/or information in the control header. For example, if no host descriptors are available for a particular DMA, that DMA will signal that it must drop the packet. Note that if all DMAs signal that the packet should be dropped, the packet will be purged as described above in conjunction with operation 306.

In operation 314, each responsible DMA performs its necessary processing to facilitate the transfer. This may involve identifying the necessary number of host buffers, calculating a destination address for the transfer, etc.

In operation 316, the DMAs (e.g., via the DMA scheduler) populate control tags in the control pipeline, in sync with the packet. More particularly, and as described below, for each copy of a packet placed in the data pipeline (e.g., one for each destination function), a separate control tag is placed in the control pipeline. When the DMA corresponding to a particular packet releases its control tag, the packet is considered ready for transfer.

Control tags may be pre-populated with some information (e.g., packet length, destination function), and initially stored in the control pipeline by the DMA scheduler, and will be configured with other information (e.g., destination host memory address) by a DMA engine when it completes its work.

After operation 316, when all responsible DMAs have either completed their processing and configured a control tag for their packet or have signaled that the packet (or their copy of the packet) should be dropped, the illustrated method advances to operation 350.

In operation 330, operating in parallel with operations 310-316, one copy of the packet is speculatively moved to the data pipeline for each host function that is to receive the packet. In particular, for each destination function (which may be determined by reading the control header), a separate copy of the packet is read into the data pipeline. When the last copy has been successfully placed, the buffer may be informed that reading is complete; the buffer can therefore advance its read pointer.

In operation 332, if a reject signal is received from a DMA context or on behalf of a host (e.g., from host interface logic), transfer of the packet is aborted. As described below, rejection or error may be signaled anytime before or during transfer of a packet to the host.

In operation 350, if no fatal errors have been signaled, the packet and control information (i.e., the control tags) are presented to the host interface logic. Before releasing the packet, it may be aligned or padded as necessary to facilitate transfer. As mentioned previously, to reduce the handshaking overhead, the packet may be presented to the bus interface in synchronization with a request to accept the packet.

Even while transferring the packet, an error may occur that requires the packet to be dropped. For example, it may be determined that a destination function has been reset or is otherwise unavailable. In this event, the data will be flushed.

After the packet has been transferred, the method may end or may return to operation 304 to process the next packet in the packet buffer. Note, however, that the control header for the packet subsequent to the packet transferred in operation 350 may be read even before the transfer is complete.

Embodiments of the invention are configured to provide isolation or separation between different hosts and between different functions on one host. This isolation prevents issues with one host or function from affecting another, such as: reset or shutdown of a function (e.g., a Function Level Reset), disablement of a function (e.g., as specified by the PCIe protocol), detection of an error by a host assembly or by a host, etc.

Thus, errors associated with or occurring during transfer of a packet may be reported by either the destination host (or function) or a host assembly transferring a packet to the host.

A recipient (e.g., a host bus interface) may issue a reject signal or otherwise report a fatal error, but in some embodiments of the invention may continue to continue reading or accepting the data, while discarding it. The DMA engine responsible for transferring the packet will flush any residual data or information without affecting any other DMA engine or function.

In the case of detection of an internal error (i.e., within the communication device), such as a parity error, an ECC error or a software error, the DMA engine requesting the transfer of a packet issues a reject signal to abort the packet transfer. The host interface logic will drop the request and discard any packet data that it may have already received. As with an externally detected error, no other functions or DMA engines are affected.

In some embodiments, when an error (or a particular type of error) is reported for a given function, the host assembly may drop one or more other packets it possesses or subsequently receives that are bound for that function. For example, if a host bus interface rejects a packet because the destination function is no longer available, other packets buffered for that same function will be discarded. As such packets are detected in the buffer, they will be dropped. The DMA engine(s) bound to that function will thus be shut down until the error is corrected or until bound to a valid function.

In some embodiments of the invention, one of the attributes that are associated with a packet during its preparation for transfer and for the actual transfer to a host is a "type" attribute that indicates whether the packet is good or bad. If an error is received, the attribute is set to bad to signal the host and the host assembly that the transfer has failed.

Thus, a DMA can continue its work without blocking on one particular packet and, in addition, an error with one packet or with one destination function does not block the transfer of other packets or transfers to other destination functions.

Figure 4:
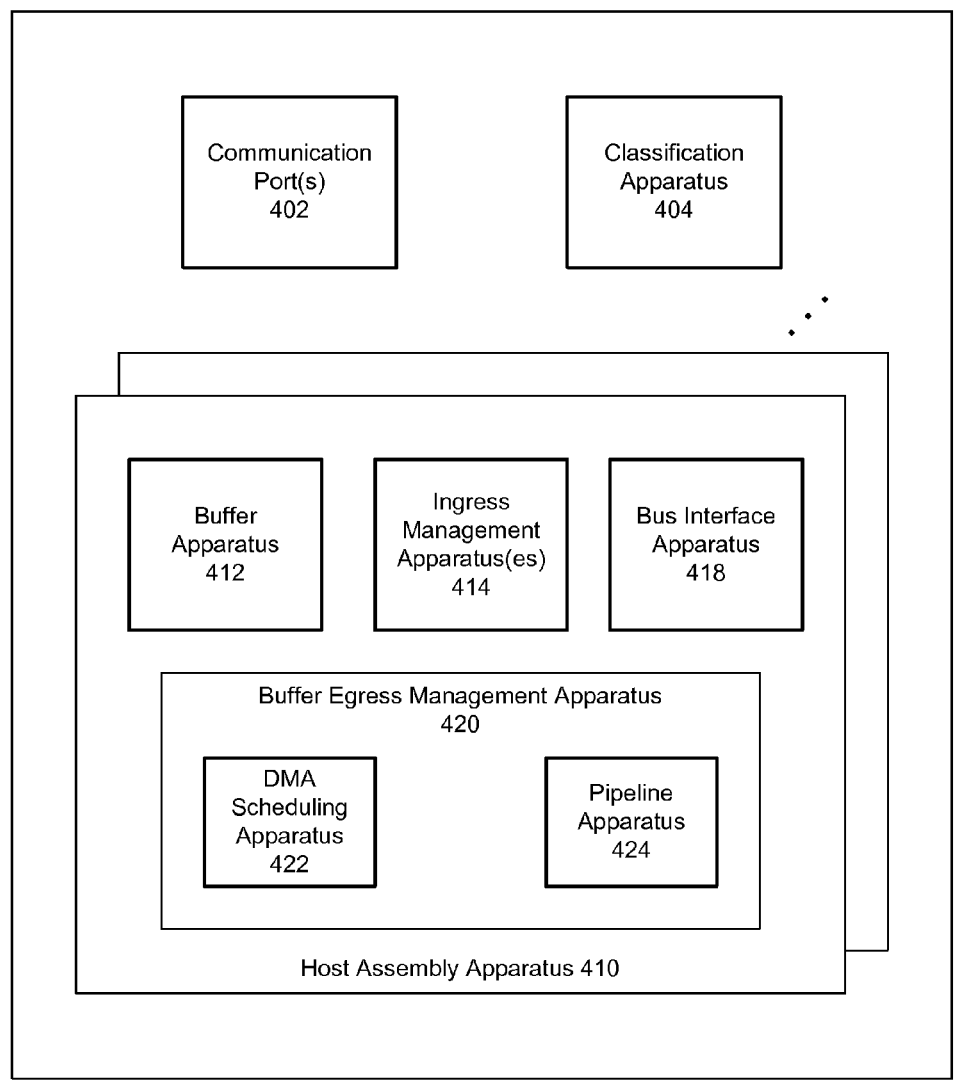
FIG. 4 is a block diagram of a communication apparatus that can be shared among multiple hosts and functions through virtualization of its ports, according to some embodiments of the invention.

FIG. 4 is a block diagram of a communication apparatus that can be shared among multiple hosts and functions through virtualization of one or more ports, according to some embodiments of the invention.

Communication apparatus 400 of FIG. 4 comprises one or more communication ports 402 for receiving packets, frames, datagrams, cells or other communications from networks or other communication links. Apparatus 400 also includes classification apparatus 404 and one or more host assembly apparatuses 410. Each host assembly apparatus comprises buffer apparatus 412, one or more buffer ingress management apparatuses 414, bus interface apparatus 418 and buffer egress management apparatus 420. Each host assembly apparatus 410 is allocated to a single host, but can be dynamically reallocated to a different host, and multiple host assembly apparatuses may be concurrently allocated to the same host.

Classification apparatus 404 is adapted to classify a communication received at apparatus 400 to identify a physical or virtual function to which the communication is directed. To classify the communication, classification apparatus 404 may examine its contents (e.g., protocol headers, payload) and compare those contents to entries stored in one or more classification tables to identify a flow or connection to which the communication belongs. Classification apparatus 404 may also identify a function corresponding to the flow, select one or more DMA engines for transferring the communication to one or more functions, and/or perform other tasks to help direct the packet's data to its destination(s).

Each buffer apparatus 412 is adapted to store packets for transfer to its destination host and functions, along with separate control headers for each packet.

Access to each buffer apparatus is managed by a set of buffer ingress management apparatuses 414. As described above, for each function supported by the buffer, a separate buffer ingress management apparatus may be instantiated or activated to serve that function. The buffer ingress management apparatuses are adapted to apply dynamically programmable criteria to filter packets received from classification apparatus 404, so as to allow only packets desired by their corresponding functions to be stored in their associated buffer apparatus 412.

Departure of packet data from each buffer apparatus is managed by buffer egress management apparatus 420, which comprises DMA scheduling apparatus 422 and pipeline apparatus 424. The buffer egress management apparatuses are adapted to process each set of packet data according to control information stored in the buffer apparatus with the packet data. The control information may identify which host/function to transfer the packet data to, how to perform the transfer (e.g., which DMA engine, which bus interface logic), why the packet was accepted by the host assembly apparatus 410, etc.

More specifically, DMA scheduling apparatus comprises multiple DMA engines/contexts, each of which is bound to a function hosted by the host corresponding to the host assembly apparatus 410. Those DMAs prepare packets for transfer to their functions and populate a control portion of pipeline apparatus 424 with information consumed by the bus interface apparatus 418 to perform a packet transfer.

Pipeline apparatus 424 also comprises a data portion into which a packet is speculatively copied (once for each destination function) while the DMA engines operating on behalf of the destination function or functions perform their processing to facilitate the packet's transfer.

Bus or host interface apparatus 418 is adapted to configure a packet for transmission to the destination host via the appropriate physical media.

Managing Interrupts in a Virtualized Communication Device

In some embodiments of the invention, methods and apparatus are provided for managing interrupts within a virtualized input/output device, such as a device described above. In these embodiments, interrupt resources are dynamically bound to functions executing on supported hosts, and their interrupts are managed so as to avoid blocking any host or function.

Illustrative network interface device interrupt resources that may be managed include receive (Rx) and transmit (Tx) DMAs, Rx and Tx VMACs, Rx and Tx mailboxes, error and/or others. In one implementation, each host assembly of a network interface device (e.g., host assembly 106a of FIG. 1) is allocated a default number of interrupt resources (e.g., 16), which are assigned as necessary to the functions operating on the host assembly's corresponding host.

For example, if the host assembly's supported host includes only one function, then all of the host assembly's resources can be dedicated to that one function, although only one instance of each type of interrupt resource may be needed. In contrast, if the supported host comprises four functions, each function may be allocated one Rx DMA and one Tx DMA interrupt resource, and one of each of the other types of interrupt resources may be shared among the functions.

As described in the preceding section, in a consolidated mode of operation, multiple host assemblies may support a single host. In this mode, interrupt events from all of the supporting interrupt resources, across all participating host assemblies, are merged into a unified interrupt scheme for the single host. Dynamic migration of interrupt resources, to support different functions or hosts at different times, provides great flexibility in the management of interrupts through the device.

Figure 5:
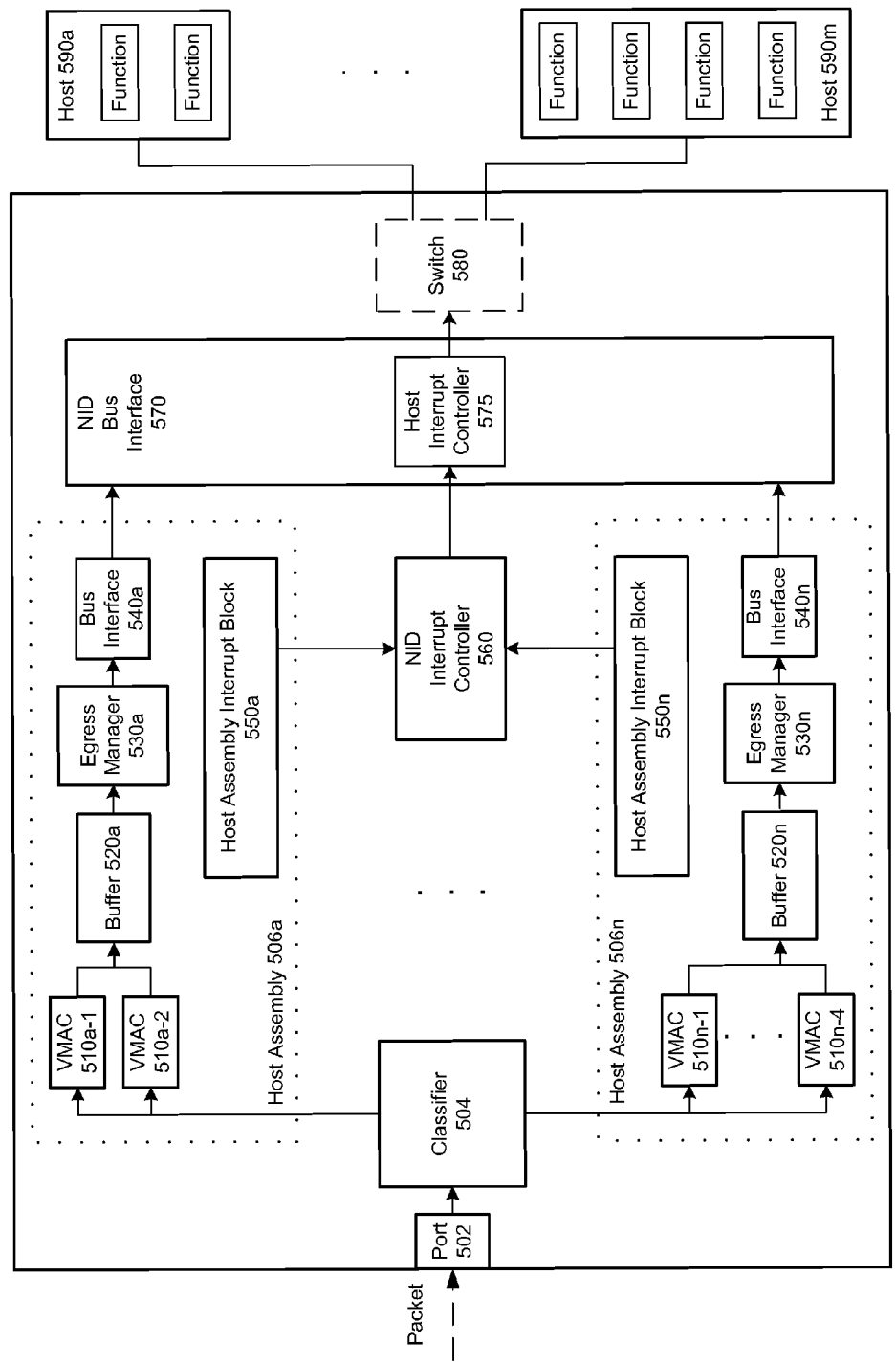
FIG. 5 is a block diagram of a virtualizable network interface device in which interrupts may be managed according to some embodiments of the invention.

FIG. 5 is a block diagram of a virtualizable network interface device in which interrupts may be managed according to some embodiments of the invention. Many elements of network interface device 500 may operate in the same or a similar manner as described above with regard to network interface device 100 of FIG. 1.

However, in FIG. 5, each host assembly 506 includes a host assembly interrupt block 550, which communicates with NID (Network Interface Device) interrupt controller 560. NID interrupt controller 560 communicates with host interrupt controller 575 to report interrupts to the appropriate host. Further details of these elements of device 500 are described below in conjunction with FIGS. 7A-C.

Figure 6:
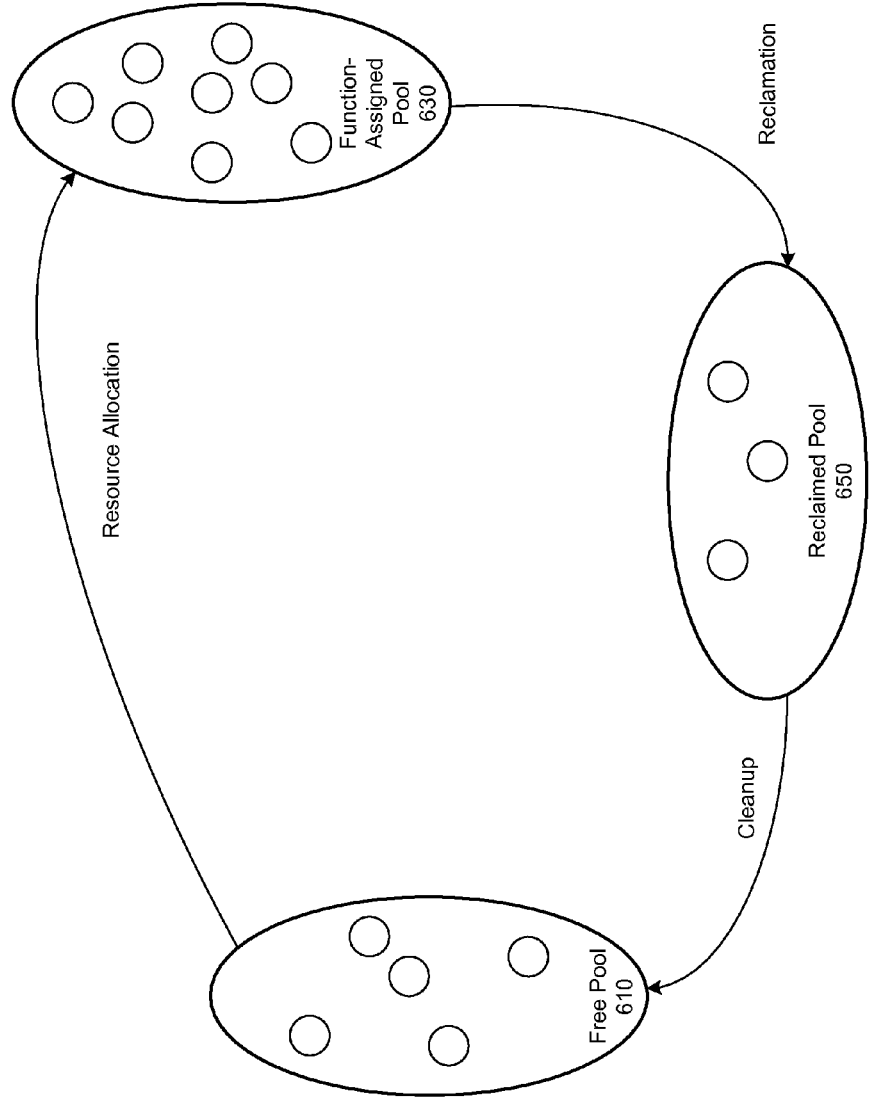
FIG. 6 is a state diagram demonstrating the allocation and transition of interrupt resources among functions supported by a virtualizable communication device, according to some embodiments of the invention.

FIG. 6 is a state diagram demonstrating dynamic allocation and re-allocation of interrupt resources within a virtualizable network interface device such as device 500 of FIG. 5. Free pool 610 comprises interrupt resources that are not currently bound to a function. As mentioned above, these resources may include Rx/Tx DMAs, Rx/Tx VMACs, Rx/Tx mailboxes, and/or others.

In one specific implementation, communication device 500 of FIG. 5 may comprise 48 Rx DMA interrupt resources, 48 Tx DMA interrupt resources, 12 Rx and 12 Tx VMAC interrupt resources, 12 Rx and 12 Tx mailbox interrupt resources, 12 error interrupt resources, and possibly some number of reserved resources. In this implementation, if the device comprises 12 host assemblies, each host assembly may have control over an equal number of resources, to be allocated to the function(s) supported by that host assembly. Alternatively, resources may be directly allocated to functions instead of first being divided by host assembly.

In other implementations, communication device 500 may comprise significantly more resources, which may be allocated against a greater number of host assemblies and/or functions. As will be seen in the following discussion, the manner in which interrupts are routed and managed scales efficiently to handle large numbers (e.g., hundreds, thousands) of interrupt resources, of the types identified above and/or others.

When a resource is bound or allocated to a function, it transitions to function-assigned pool 630, which may comprise multiple sub-pools, such as one sub-pool for each function supported by the communication device. Pools or sub-pools of resources allocated to functions operating on a single host may be tied together, so as to assist in the management of message transmission credits and/or provide other benefits.

Because each function's interrupt resources are logically isolated, a problem with one function (or host) such as a communication delay will not affect other functions and hosts, thereby avoiding blocking A particular function's pool or sub-pool of allocated resources is shut down when the function is reset (e.g., through an FLR), the function's host is reset, the bus master is turned off or when another event occurs that makes the function inactive or unavailable.

An interrupt signaled by a particular resource is only visible to the single function to which the resource is bound. When a resource is released (e.g., when its function is reset), it transitions to reclaimed pool 650 before being returned to free pool 610 (in a cleanup operation) or before being allocated to a different function.

Transition of a resource to reclaimed pool 650 before returning it to the free pool 610 allows time for all events (e.g., interrupts) associated with that resource to be resolved, cleared or reset, and for the resource to be removed from the resource bind array (described below) of its previous function.

In some embodiments of the invention, an EPS (Embedded Processor System) or other supervisor entity allocates resources to functions. There may be a default allocation performed when the communication device is initialized (e.g., to provide mailbox, error and/or other interrupt resources to each host assembly). After device initialization, the supervisor may allocate and reallocate resources in response to requests received from software images associated with functions executing on supported hosts.

Thus, allocation of interrupt resources to host functions is performed within the network interface device without necessarily considering how many interrupt vectors a given host may employ.

The number of interrupt vectors a function may use is determined and assigned by the operating system under which the function executes. Different functions may operate under different operating systems, and may receive different numbers of vectors, up to a maximum number of vectors implemented by the operating system. In addition, different operating systems may employ different types of interrupts (e.g., MSI or Message Signaled Interrupt, MSI-X or Message Signaled Interrupt-Extension, INTx).

Efficient management of interrupts within the communication device is thus important, because the number of interrupt vectors allocated to a function by its operating system is unlikely to exactly match the number of interrupt resources allocated to that function within the communication device. In fact, the number of interrupt resources may be far greater than the number of interrupt vectors. A (virtual) device driver executed by the function to drive the communication device may identify to the device the number of interrupt vectors allocated to the function, to allow the device to be configured and managed as described herein.

Figure 7A:
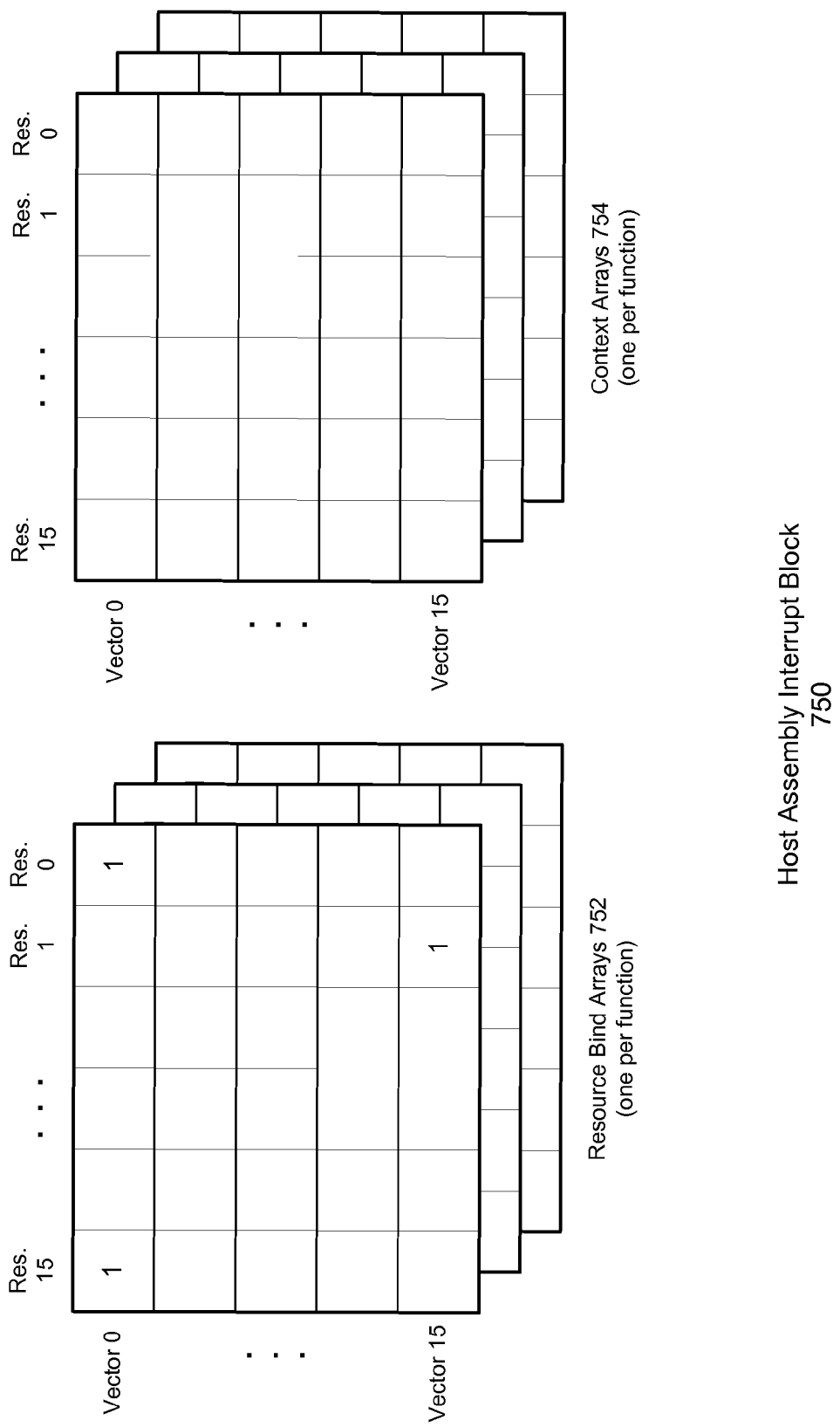
FIGS. 7A-C are block diagrams demonstrating management of an interrupt through a virtualizable network interface device, according to some embodiments of the invention.
Figure 7B:
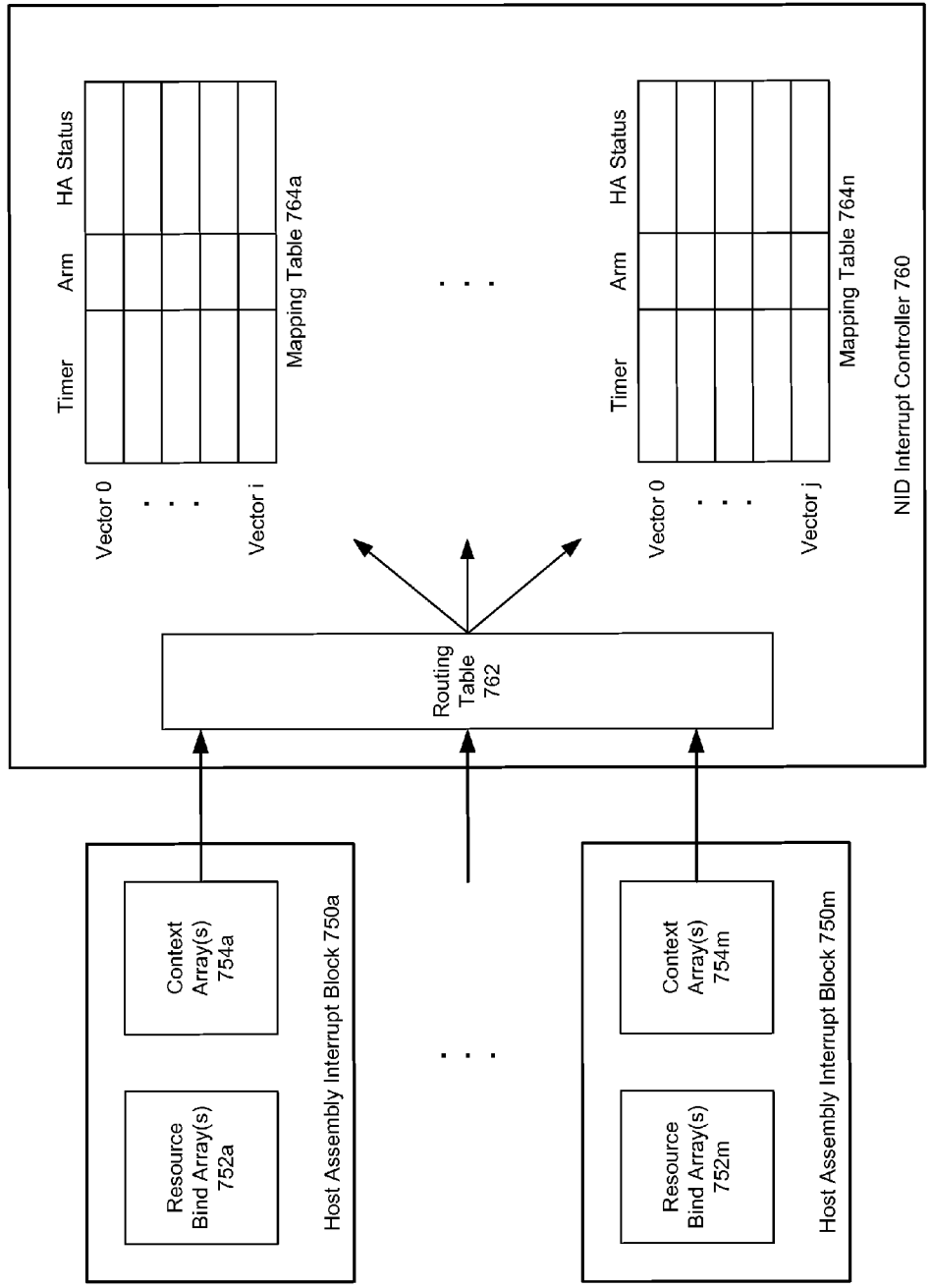
Figure 7C:
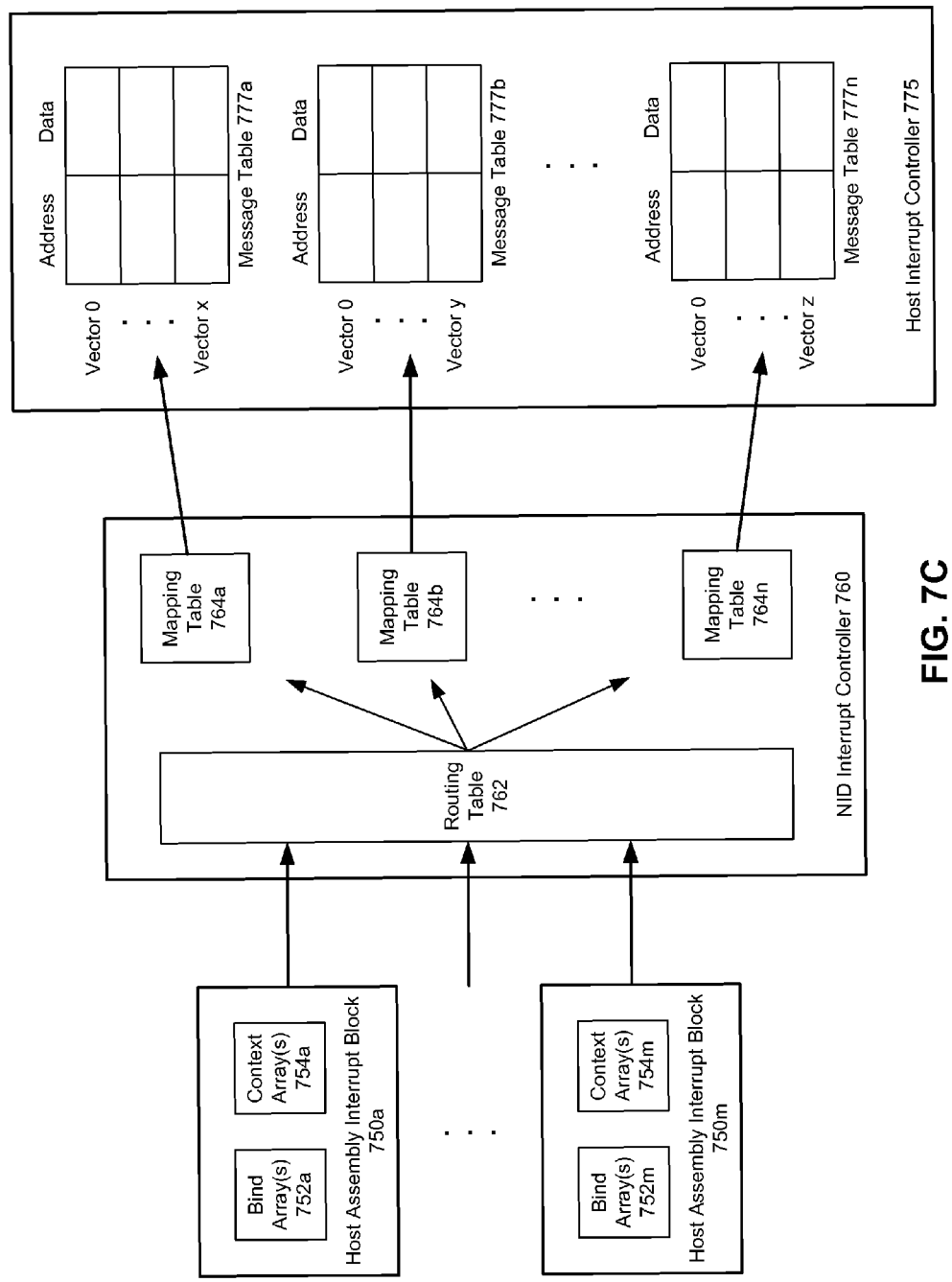

FIGS. 7A-C are block diagrams of a host assembly interrupt block, a NID interrupt controller and a host interrupt controller, to demonstrated their coordination according to some embodiments of the invention.

As shown in FIG. 7A, a host assembly block may comprise multiple pairs of two primary data structures—resource bind array 752 and context array 754. One pair of arrays 752, 754 supports each function that exists on the host assembly's corresponding host. One dimension of each array is indexed by interrupt vector, while the other dimension is indexed by interrupt resource (each resource may have a unique identifier). In an embodiment of the invention in which each host assembly supports a maximum of four functions, there may be a maximum of four pairs of arrays 752, 754.

Each resource bind array 752 maps every interrupt resource allocated to the array's associated function to an interrupt vector allocated to that function. For example, in FIG. 7A, interrupt resources 0 and 15 are mapped to interrupt vector 0, while resource 1 is mapped to vector 15. A resource bind array thus indicates which interrupt vector should be used to report an interrupt signaled by a particular resource.

During operation of the communication device, an interrupt resource may migrate from one interrupt vector to another. Also, it should be noted that a vector identified by a particular index number in one resource bind array is different from a vector having the same index number in a different bind array, because they correspond to different functions; therefore, different interrupt messages would be issued to the corresponding functions.

Each context array uses the same indices as the corresponding resource bind array, but is used to save interrupt contexts. In particular, when an interrupt message is forwarded from host assembly interrupt block 750 (to NID interrupt controller 760), context array 754 is used to identify the resource(s) and interrupt vector(s) that caused the message.

For example, if an interrupt is reported on vector 0 for resource 15, an appropriate value (e.g., 1) will be stored in the corresponding cell of context array 754. This will allow an interrupt handler routine executed in response to the interrupt to quickly identify the source(s). More than one cell may be marked for a given vector if more than one of that vector's resources report interrupts.

In the illustrated embodiment, arrays 752, 754 are of static sizes, based on a maximum number of supported interrupt vectors (e.g., 16) and a maximum number of interrupt resources that may be allocated to one function within one host assembly (e.g., also 16). In these implementations, only a number of interrupt vectors equal to the number of vectors allocated to the corresponding function are active within each array. Thus, if a function is granted use of only four interrupt vectors, only the four corresponding entries in corresponding arrays 752, 754 will be populated. No interrupt resource will be mapped to an inactive vector.

In other embodiments of the invention, the maximum numbers of interrupt resources and interrupt vectors allocated to a function need not be equal, and may be greater than, equal to or less than 16. In yet other embodiments, different arrays may be of different sizes.

FIG. 7B illustrates the interplay between host assembly interrupt blocks 750 and NID interrupt controller 760 according to some embodiments of the invention. In these embodiments, an interrupt message is issued from a host assembly block to the device interrupt controller when an interrupt resource reports an interrupt event. This message may include information such as interrupt vector (vector number) and destination function (i.e., the function to which the interrupt resource is bound), and other data as desired. For example, the message may indicate whether an interrupt is being asserted or de-asserted, may identify the host assembly that originated the message, etc.

In some embodiments of the invention, every function supported by a virtualizable communication device is assigned an identifier (e.g., a number) that uniquely identifies that function. This unique function identifier may be used throughout the device—not only in the host assembly or, in consolidated mode, host assemblies, that support the function, but also in device entities such as NID interrupt controller 760 and NID bus interface 570.

An interrupt message from a host assembly interrupt block is received at routing table 762 of NID interrupt controller 760. From there, it is routed to a mapping table 764 that corresponds to the interrupt's destination function; each mapping table manages the timing of interrupts for one function.

The mapping tables are indexed by vector number, and each entry comprises a timer field, an arm field and a host assembly status field. The timer field comprises a timer that counts time until another interrupt may be fired. That is, once the timer is started, no interrupt can be fired on that interrupt vector until the timer expires. The timer is set and starts counting after the servicing of a previous interrupt has completed.

The arm field comprises a gate that can prevent an interrupt from firing even if the timer has expired. In particular, the arm field is cleared or disarmed (stores one value) when an interrupt handling routine begins servicing an interrupt, and is set or armed (stores a second value) after servicing is complete. Without the arm field, after the timer expires and an interrupt is issued and interrupt servicing commences, another interrupt could be fired (because the timer has not yet been reset). By disarming the arm gate when interrupt servicing commences, and only allowing an interrupt to be issued when the gate is armed (regardless of the status of the timer), the number/frequency of interrupts can be decreased.

The host assembly status field stores an identifier (e.g., host assembly number) of the host assembly that originated an interrupt message that caused an interrupt to be fired and serviced. Thus, by reading the host assembly status field, an interrupt service routine can quickly determine which host assembly interrupt block(s) (and context array(s)) it should examine to find the source(s) of the interrupt.

As described in a previous section, a communication device may support a consolidated mode of operation in which multiple host assemblies support a single function. In this mode of operation, each host assembly still includes a resource bind array 752 (and context array 754) for that function, but NID interrupt controller will maintain only a single mapping table. Thus, in consolidated mode, interrupts from multiple different host assemblies are coalesced at the function's mapping table.

In some embodiments of the invention, an entry for a given interrupt vector (i.e., a vector having a particular index number) in a resource bind array and context array will map to the same vector (and index number) in the destination function's corresponding function table. In other embodiments of the invention, this is not required.

The host assembly status field is thus particularly useful in the consolidated mode of operation, so as to require only one read in order to identify the host assembly or assemblies from which an interrupt originated.

FIG. 7C illustrates interaction between NID interrupt controller 760 and host interrupt controller 775 (of a NID bus interface), according to some embodiments of the invention.

Host interrupt controller 775 comprises one message table for each function supported by the communication device. Each table is used to prepare and/or further manage interrupts issued to the corresponding host/function. The format of a message table 777 and the content of its entries depend on the type of interrupts employed by the destination function.

Thus, for MSI-X interrupts, a separate data/address pair is stored for each interrupt vector allocated to the corresponding function. For MSI interrupts, the same address may be used for each vector, but with different data values. Thus, different message tables may have different sizes (e.g., number of vectors, number of fields) and configurations.

INTx interrupts may be handled differently, due to their nature. In one implementation, a separate message table or a separate entry in one message table, or some other data structure altogether, may correspond to each INTx label (e.g., INTA, INTB, INTC, INTD). For each supported host, each active INTx label may be shared by any number of functions active on that host.

Or, if the number of functions on a host is less than or equal to the number of INTx labels, each function may have sole use of a label. In this case, a separate message table may be implemented for each function, as with MSI and MSI-X interrupts.

A message table or other structure supporting an INTx interrupt may comprise a flag or toggle used to indicate whether that label has been used to send an interrupt to the host. Any number of interrupt events, detected by any number of interrupt resources, may be tied to that interrupt. Once the flag is raised or set, the label cannot be used again until the interrupt and its sources have been serviced, the interrupt message has been de-asserted and the flag has been cleared.

Host interrupt controller 775 thus receives an interrupt message from NID interrupt controller 760 (e.g., from a mapping table), which identifies the destination function and vector number and/or other information (e.g., source host assembly). This information is used to access the corresponding message table and retrieve the necessary address/data. The NID bus interface comprising the host interrupt controller can then transmit the correct PCIe message to the destination function.

In some embodiments of the invention, for each interrupt message forwarded by a host assembly interrupt block 750, a response is received (e.g., from host interrupt controller 775, from NID interrupt controller 760). Illustrative responses include Accept, Reject and Retry; different responses may be provided for in other embodiments of the invention.

An "accept" response indicates that the interrupt message was accepted. A "reject" response indicates that the message was rejected, possibly because the destination function was reset or is otherwise unavailable. When a reject response is received for an interrupt message for a particular function, the host assembly may thereafter treat that function as if it were non-existent, and therefore stop forwarding interrupts and normal communications (packets) until notified that the function is now available.

A "retry" response indicates that the interrupt message could not be acted upon, and that the host assembly should re-send it at a later time. Illustratively, the NID bus interface may not have any available credits for the destination host/function, or an interrupt could not be sent for some other temporary/transient reason.

Figure 8:
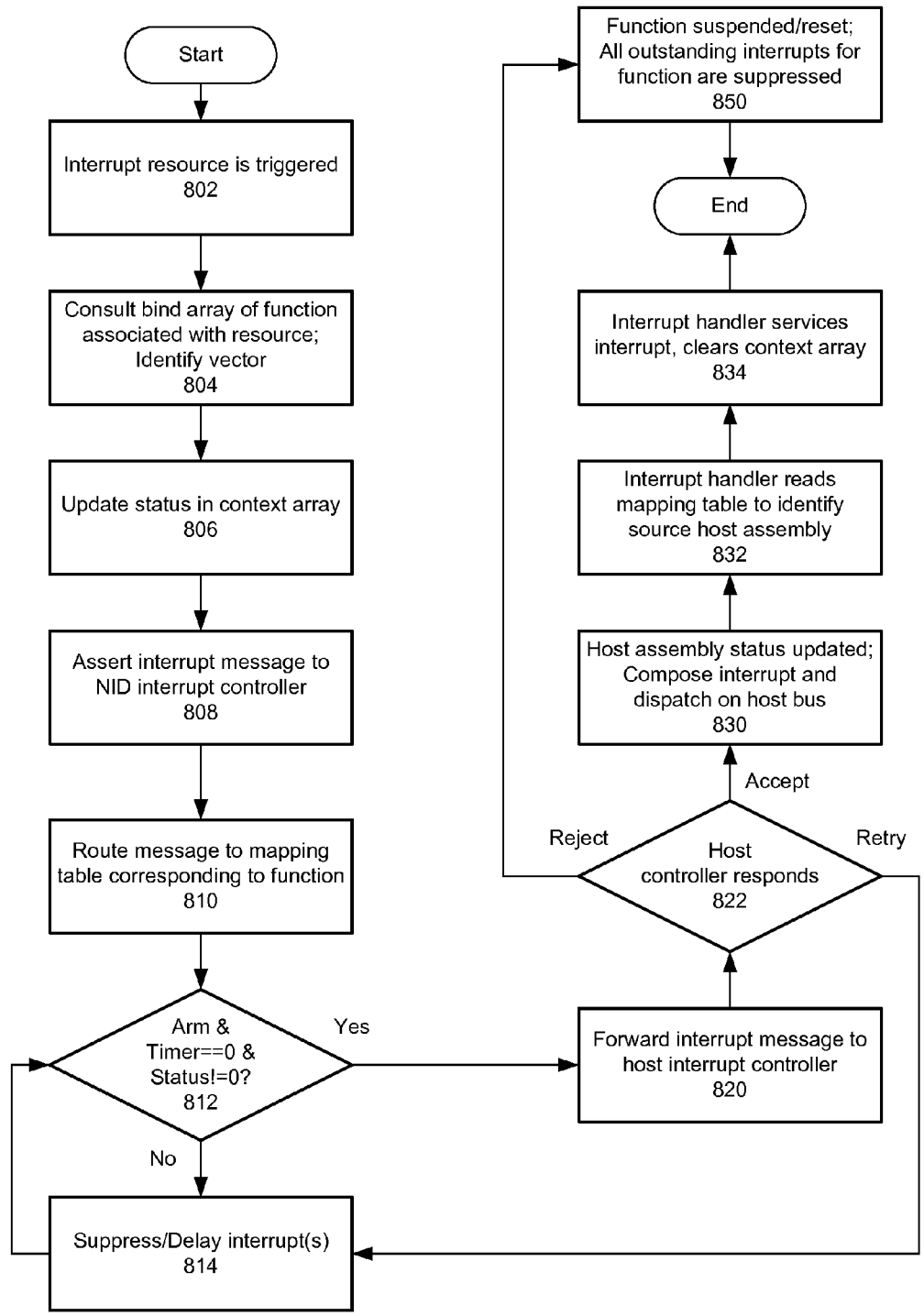
FIG. 8 is a flow chart demonstrating a method of managing an interrupt within a virtualizable network interface device, according to some embodiments of the invention.

FIG. 8 illustrates a method of managing the issuance of an interrupt within a virtualizable communication device, according to some embodiments of the invention. Prior to this method, any number of interrupt resources within the device are allocated to any number of functions supported by the device.

In operation 802, an interrupt resource within the communication device is triggered. The resource may be triggered because of receipt or transmission of a packet, receipt or transmission of a mailbox message, connection or disconnection of a communication link, an error or any other event that may cause an interrupt.

As described above, the interrupt resource is bound to a particular function supported by a particular host assembly within the communication device. Because it is possible that more interrupt resources than interrupt vectors are allocated to the function, and therefore there is unlikely to be a one to one mapping between resources and vectors, the correct vector for reporting the event must be chosen.

In operation 804, a signal from the interrupt resource is received at an interrupt block of the host assembly currently using the resource. Within the interrupt block, an identity of the interrupt resource is used to lookup the correct interrupt vector within a resource bind array associated with the function supported by the resource.

In operation 806, a corresponding cell in the resource bind array's associated context array is updated to indicate that the resource has signaled for an interrupt. This cell will be cleared by software when the interrupt is serviced.

In operation 808, the host assembly interrupt block asserts an interrupt message to a device interrupt controller, and identifies the supported function and the interrupt vector on which the interrupt is signaled.

In operation 810, within the device interrupt controller, the interrupt message is routed to a mapping table associated with the supported function. Within that mapping table, a host assembly status field may not be updated to identify the host assembly that originated the interrupt message until the interrupt message is acknowledged by the host interrupt controller. Until that time, the interrupt may be suppressed or delayed for various reasons (e.g., lack of transmission credits, timer not expired).

In operation 812, the device interrupt controller determines whether an interrupt can be issued for the interrupt vector identified in the interrupt message. In some embodiments of the invention, only if a timer associated with the interrupt vector has expired and the vector is armed may an interrupt be issued; otherwise, issuance of an interrupt must be delayed. If an interrupt can be issued, the method advances to operation 820.

Otherwise, in operation 814, the interrupt is suppressed or delayed. It may be noted that, in the consolidated mode of operation, interrupt messages may be received from multiple host assemblies. Multiple messages may thus be merged or unified at the message table to await notification of the host interrupt controller.

After operation 814, the method may return to operation 812 to wait until an interrupt can be issued on the vector, may return to operation 802 to handle another interrupt, or may take other action. As one skilled in the art will appreciate, many different activities related to the management of interrupts within the communication device may be carried out in parallel, and the flow chart of FIG. 8 is intended to illustrate various operations associated with such management, and may occur in parallel or in a sequence other than that illustrated in FIG. 8.

In operation 820, when an interrupt can be signaled for the indicated vector, a signal (e.g., the interrupt message from a host assembly) is forwarded to the host interrupt controller, which may be implemented as part of host bus interface logic. Within the host interrupt controller, a message table corresponding to the supported function may be referenced.

In operation 822, the host interrupt controller responds to the device interrupt controller regarding the interrupt message reported by the device interrupt controller. If the response is Accept, the illustrated method continues with operation 830.

If the host interrupt controller signals Retry, the device interrupt controller must back off and retry the interrupt message at a later time. Thus, the method may return to operation 814 to await a later opportunity to report the interrupt message to the host interrupt controller. In some implementations the device interrupt controller may be able to retry a previously attempted interrupt message before a timer associated with the corresponding interrupt vector has expired.

Otherwise, if the host interrupt controller signals Reject in operation 822, this means that the destination function is no longer available for some reason (e.g., it has been reset). Thus, in operation 850, all outstanding interrupts for that function are suppressed and all tables and logic associated with the function may be placed in a suspend state to await cleanup, and the function's interrupt resources may be migrated back to a free pool for re-allocation. After operation 850, the method may end or may return to operation 802 to manage a new interrupt event for a different function.

In operation 830, an interrupt is composed and signaled on the host bus (e.g., a PCIe bus), using information (e.g., address and data) retrieved from the message table. Because the host interrupt controller has accepted the interrupt message, the host assembly status in the mapping table of the device interrupt controller can now be updated to identify the host assembly or host assemblies from which the interrupt event(s) originated.

In operation 832, software within the function (e.g., an interrupt service routine within a device driver for driving the communication device) receives the interrupt and reads the supported function's mapping table in the device interrupt controller in order to identify the host assembly from which the interrupt originated. By referring to the host assembly status field, the software can quickly identify the sources (host assemblies) of all interrupt events covered by the interrupt.

In operation 834, the software services the interrupt, taking whatever action may be appropriate. This may include clearing appropriate entries or cells in a context array, the mapping table, and so on.

After operation 834, the method ends or may return to operation 802 to handle another interrupt event.

The environment in which a present embodiment of the invention is executed may incorporate a general-purpose computer or a special-purpose device such as a hand-held computer or a computer server. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An input/output device for simultaneously supporting multiple hosts and multiple functions, the input/output device comprising:
 a communication port through which the input/output device receives communications for the multiple hosts and multiple functions;
 a plurality of host assemblies, each host assembly supporting a single host and comprising:
  a plurality of interrupt resources, wherein each interrupt resource is configured to detect an interrupt condition and is dynamically bound to at least one function of the single host; and
  an interrupt block configured to receive notification of an interrupt condition from an interrupt resource and identify an interrupt vector to which the resource is currently bound, wherein said interrupt block comprises, for each of one or more functions hosted by the single host:
   a resource bind array configured to identify bindings between the plurality of interrupt resources and the one or more functions; and
   a context array configured to identify an interrupt resource that detected an interrupt condition;
 a device interrupt controller configured to receive an interrupt request from the interrupt block and determine whether an interrupt is permitted on the interrupt vector based on a timing mechanism associated with the interrupt vector; and
 a host interrupt controller configured to issue an interrupt to the single host in a format accepted by the bound function.

2. The input/output device of claim 1, wherein said device interrupt controller comprises:
 for each function supported by the input/output device, a corresponding mapping table configured to identify timing statuses of each interrupt vector employed by the function; and
 a routing table configured to route the interrupt request to the mapping table corresponding to a destination function of the interrupt message.

3. The input/output device of claim 2, wherein each said mapping table comprises, for each interrupt vector employed by the corresponding function:
 a timer;
 a gate; and
 a host assembly status field configured to identify the host assembly from which the interrupt message originated.

4. The input/output device of claim 3, wherein an interrupt is permitted on a given interrupt vector if:
 said timer has expired; and
 said gate is armed.

5. The input/output device of claim 1, wherein said host interrupt controller comprises:
 for each function supported by the input/output device, a message table configured with information for composing an interrupt to the function.

6. The input/output device of claim 5, wherein:
 at least one message table comprises information for composing an MSI (Message Signaled Interrupt) interrupt; and
 at least one other message table comprises information for composing an MSI-X (Message Signaled Interrupt Extension) interrupt.

7. The input/output device of claim 1, wherein the input/output device is configured for a consolidated mode of operation in which at least two of the host assemblies support a first host.

8. The input/output device of claim 1, wherein the plurality of interrupt resources comprises at least one of each of:
   a receive DMA (Direct Memory Access) interrupt resource;
   a transmit DMA interrupt resource;
   a receive VMAC (Virtual Media Access Controller) interrupt resource;
   a transmit VMAC interrupt resource;
   a receive mailbox interrupt resource;
   a transmit mailbox interrupt resource; and
   an error interrupt resource.

9. A method of managing interrupts in an input/output device for simultaneously supporting multiple hosts and multiple functions, the method comprising:
   within a first host assembly supporting a first host, detecting an interrupt event at a first interrupt resource bound to at least a first function of the single host;
   identifying a first interrupt vector, of the first function, to which the first interrupt resource is bound by using an interrupt block, wherein said interrupt block comprises, for each of one or more functions hosted by the single host:
      a resource bind array configured to identify bindings between plurality of interrupt resources and the one or more functions; and
      a context array configured to identify an interrupt resource that detected an interrupt condition;
   determining whether an interrupt is permitted on the first interrupt vector based on a timing mechanism associated with the first interrupt vector; and
   signaling an interrupt toward the first host, using data retrieved from storage associated with the first function.

10. The method of claim 9, further comprising, after said accessing:
   updating a context array associated with the first function to identify the interrupt resource that detected the interrupt event.

11. The method of claim 9, further comprising, after said identifying:
   issuing an interrupt request message from the first host assembly to a device interrupt controller.

12. The method of claim 11, further comprising, after said issuing, receiving at the first host assembly a response to the interrupt request message, wherein the response consists of one of:
   accept;
   reject; and
   retry.

13. The method of claim 11, wherein said determining comprises:
   at the device interrupt controller, routing the interrupt request message to a first mapping table corresponding to the first function, wherein the device interrupt controller comprises one mapping table for each function supported by the input/output device; and
   within the first mapping table, examining a status of a timer associated with the first interrupt vector.

14. The method of claim 9, wherein said determining comprises:
   determining whether a timer associated with the first interrupt vector has expired; and
   determining whether a gate associated with the timer is armed;
   wherein the timing mechanism permits an interrupt to be issued on the first interrupt vector if the timer has expired and the gate is armed.

15. The method of claim 9, wherein said signaling comprises:
   identifying a message table associated with the first interrupt vector, wherein the message table is configured to store content of an interrupt signal in a format accepted by the first function; and
   from the message table, retrieving a set of information corresponding to the first interrupt vector;
   wherein the storage comprises the message table.

16. A method of managing interrupts in an input/output device for simultaneously supporting multiple hosts and multiple functions, the method comprising:
   binding multiple host assemblies of the input/output device to a first supported host;
   in each of the multiple host assemblies, binding a first subset of interrupt resources to at least a first function of the single host;
   in at least one of the multiple host assemblies, detecting an interrupt event in the first subset of interrupt resources;
   in each of the at least one host assembly, identifying an interrupt vector through which to notify the first function of the interrupt event by using an interrupt block, wherein said interrupt block comprises, for each of one or more functions hosted by the single host:
      a resource bind array configured to identify bindings between the plurality of interrupt resources and the one or more functions; and
      a context array configured to identify an interrupt resource that detected an interrupt condition;
   from each of the at least one host assembly, issuing an interrupt message to a device interrupt controller; and
   at the device interrupt controller, merging the interrupt messages from each of the at least one host assembly into a consolidated interrupt message, wherein the device interrupt controller is configured to determine whether the consolidated interrupt message is permitted on the interrupt vector based on a timing mechanism associated with the interrupt vector.

17. The method of claim 16, wherein said merging comprises, for each interrupt message from the at least one host assembly:
   consulting a single mapping table associated with the first function; and
   wherein the single mapping table is configured to identify a host assembly from which the interrupt message was received.

18. The method of claim 16, wherein said identifying comprises:
   accessing a resource bind array of said interrupt block configured to map between interrupt resources bound to the first function and interrupt vectors employed by the first function.

19. The method of claim 16, wherein said identifying an interrupt vector comprises:
   referencing, within each of the at least one host assembly, a data structure configured to map each interrupt resource of the first subset of interrupt resources to a single interrupt vector of the first function.

* * * * *

UNITED STATES PATENT AND TRADEMARK OFFICE
CERTIFICATE OF CORRECTION

PATENT NO. : 8,606,975 B2
APPLICATION NO. : 12/784631
DATED : December 10, 2013
INVENTOR(S) : Srinivasan et al.

It is certified that error appears in the above-identified patent and that said Letters Patent is hereby corrected as shown below:

In the Specification

In column 1, line 52, delete "blocking" and insert -- blocking. --, therefor.

In column 13, line 63, delete "blocking" and insert -- blocking. --, therefor.

Signed and Sealed this
Eighth Day of July, 2014

Michelle K. Lee
*Deputy Director of the United States Patent and Trademark Office*